Nov. 13, 1945.    M. H. HECHT    2,388,846
ADHESIVE AND ADHERENT COATING COMPOSITION FOR BITUMINOUS SURFACES
Filed March 19, 1942

Patented Nov. 13, 1945

2,388,846

UNITED STATES PATENT OFFICE 2,388,846

ADHESIVE AND ADHERENT COATING COMPOSITION FOR BITUMINOUS SURFACES

Myer H. Hecht, Allentown, Pa., assignor to The Atlas Mineral Products Company of Pennsylvania, Mertztown, Pa., a corporation of Pennsylvania Application March 19, 1942, Serial No. 435,338

2 Claims. (Cl. 260—32)

This invention relates to an improvement in adhesive and adherent coating composition for bituminous surfaces.

Heretofore various adhesives and coating compositions adapted for adhering bituminous surfaces and for producing protective or decorative coatings on such surfaces have been known. However, such as have been known are for various purposes unsatisfactory chiefly because they exert a solvent effect upon bitumen, or, when they do not exert such effect, they are miscible with water and hence not waterproof.

Thus, by way of example, adhesives and coating compositions as heretofore used in adhering or producing decorative or protective coatings on asphalt surfaces have contained toluene, xylene, naphtha, or the like, which are solvents for bitumens, as asphalt. Such compositions are undesirable due to the fact that when applied to a bituminous surface they soften it, resulting in its easy deformation, and to the fact that they become contaminated with bitumen dissolved from the surface.

Again, other compositions heretofore used for such purpose, and which have not contained any solvent for bitumen, as asphalt, contain water-miscible components and hence are of no value where subjected to the action of water or moisture before the water-miscible components are lost.

Now in accordance with this invention there is provided a composition for use as an adhesive for bituminous surfaces, or for the formation of protective and/or decorative coatings on bituminous surfaces, which will not exert any solvent action on bitumen and hence will not promote deformation of bituminous surfaces or be contaminated with bitumen dissolved therefrom and which will be waterproof.

The composition in accordance with this invention will comprise essentially a natural or synthetic resin or plastic in solution in a nitroparaffin, a substituted nitroparaffin, a derivative of a nitroparaffin, or mixtures thereof, which are solvents for resins and plastics, substantially immiscible with water and which do not have any consequential solvent effect on bitumen; and more specifically in nitroethane, nitromethane, 1-nitropropane or 2-nitropropane, or mixtures thereof.

In the preparation of compositions according to this invention any of the natural or synthetic resins or plastics soluble in nitroparaffins, substituted nitroparaffins and derivatives of nitroparaffins, or mixtures thereof, may be used, with selection of particular resin or plastic, or mixture thereof, on the basis of their known adaptability for use in adhesive and/or protective or decorative coating compositions, depending upon the particular function for which the composition is intended.

As illustrative of resins and plastics which may be used in making up compositions according to this invention, for example, the following may be mentioned:

"Cumar" resins
"Arochlor" resins
"Bakelite" resins
Ester gum
So-called "Rezyl" resins
"Vinylite" resins
Cellulose acetate
Ethyl cellulose
Nitrocellulose And it will be understood that where the term "resin" is used in the claims appended hereto, such term is intended to embrace and include resins and plastics of the type illustrated above and which are soluble in nitroparaffin solvents mentioned above.

Compositions according to this invention may contain the resin or plastic in any desired concentration depending upon the solubility of the resin or plastic and the purpose for which the composition is intended. And, as will be appreciated, compositions according to this invention may, if desired, include additional ingredients, as, for example, a pigment, so long as such additional ingredients are not solvents for bitumen.

As illustrative of compositions according to this invention, the following formulae will provide efficient adhesive compositions:

Formula A

| | Parts by weight |
|---|---|
| Nitroethane | 50 |
| Cumar | 50 |

Formula B

| | Parts by weight |
|---|---|
| Nitromethane | 75 |
| Nitrocellulose | 25 |

Formula C

| | Parts by weight |
|---|---|
| Nitroethane | 75 |
| Cellulose acetate | 25 |

Compositions made up on the above formulae may also be used for the formation of decorative or protective coatings and, as will be obvious, the proportions of resin and nitroethane or nitromethane may be varied to obtain the desired solids content for the formation of a desired coating. Further, as has been indicated, other ingredients not incompatible with the resin, water-immiscible and non-solvent of bitumen, such as a pigment, a plasticizer, etc., may be included as desired.

Various uses of compositions in accordance with this invention are illustrated in the accompanying drawing, in which.

As illustrative of the use of compositions according to this invention for adhering bituminous surfaces, for example, an asphalt cement composition, comprising 30 parts by weight of asphalt (M. P. 245° F., ring and ball), 20 parts asphalt (M. P. 200° F., ring and ball) and 50 parts of slate flour, is melted and cast into sections, say 3 x 3 x ¼ inches with smooth, level surfaces.

Figure 2:
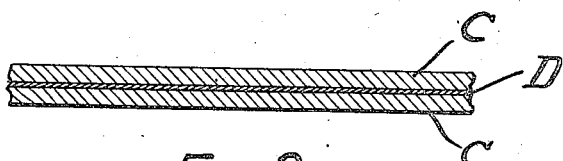
Figure 2 is a cross-sectional view of bituminous sheets plied or adhered together.

The sections, as shown at C, C, Figure 2, are joined through the medium of a layer of adhesive D made up, for example, on Formula A above.

In joining the sections C, C the adhesive may first be painted on, or otherwise applied to a surface of each and the painted surfaces then brought together. The adhesive will set or dry in about eighteen hours and the bond will be so strong that the sheets cannot be broken apart without fracturing the sections.

The sections C, C, after application of the adhesive, may be brought together under water and the adhesive permitted to set under water with the production of a bond of great strength.

Figure 1:
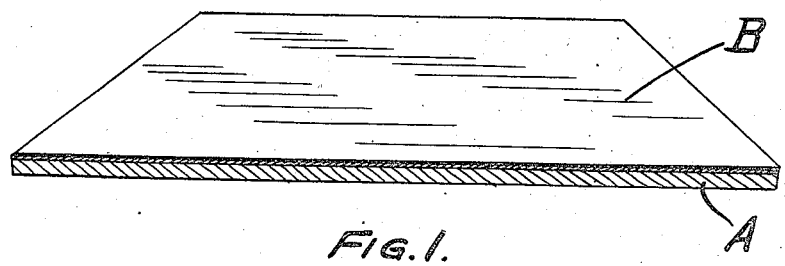
Figure 1 is a perspective view of a coated bituminous sheet.

As illustrative of the use of compositions according to this invention for the formation of protective or decorative coatings, for example, to the surface of a sheet of asphalt, or of asphalt impregnated or impregnated and coated material, A Figure 1, is applied, by painting, spraying, trowelling or otherwise, a coating B comprising a composition made up on, for example, Formula B above, with, if desired, an increased proportion of nitrocellulose.

Figure 3:
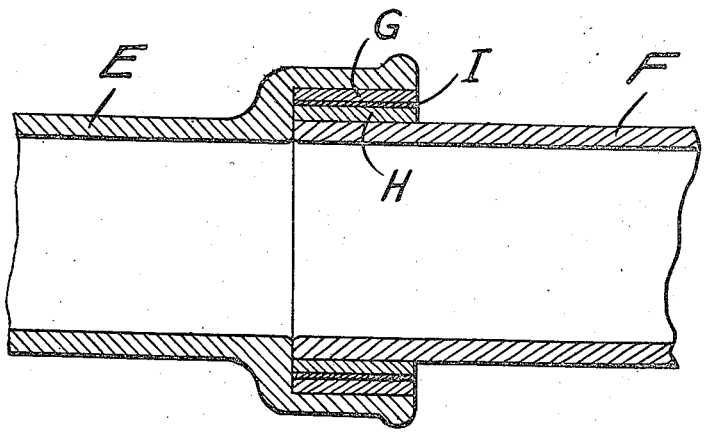
Figure 3 is a cross-sectional view of a pipe joint.

As further illustrative, compositions in accordance with this invention may be used for the joining together of sections of pipe as shown in Figure 3, which illustrates a bell end section of pipe E, within the bell of which is cast a tapered liner G, of asphalt cement, which is adhered, by a layer of cement I, made up, for example, on Formula A above, to a collar H on the spigot end of a section of pipe F extending within the bell end of section E.

In making up the pipe joint shown in Figure 3, the collar H and liner G are precast, respectively, on the spigot end of pipe section F and within the bell on pipe section E, the adhesive I is coated on the liner and collar and the spigot end is then forced into the bell.

In the use of compositions according to this invention variously as adhesives for adhering bituminous surfaces and for the production on bituminous surfaces of protective or decorative coatings, it will be noted that the bitumen will not be attacked or dissolved, with the result that the bituminous surfaces will not be softened and rendered deformable and the adhesive or coating will not be contaminated with bitumen. Further, it will be noted that when compositions according to this invention are used for coating bituminous surfaces, the coating produce will prevent strike through of the bitumen.

What I claim and desire to protect by Letters Patent is:

1. An adhesive for adhering opposed bituminous surfaces consisting essentially of a coumarone-indene resin and a nitroparaffin solvent for the resin, the adhesive being characterized by the fact that it has low miscibility with water and will not cause opposed bituminous surfaces to coalesce.

2. An adhesive for adhering opposed bituminous surfaces consisting essentially of a coumarone-indene resin and nitroethane solvent for the resin, the adhesive being characterized by the fact that it has low miscibility with water and will not cause opposed bituminous surfaces to coalesce.

MYER H. HECHT.